(No Model.)
E. A. SMEAD.
MEASURING TANK.
No. 305,973. Patented Sept. 30, 1884.
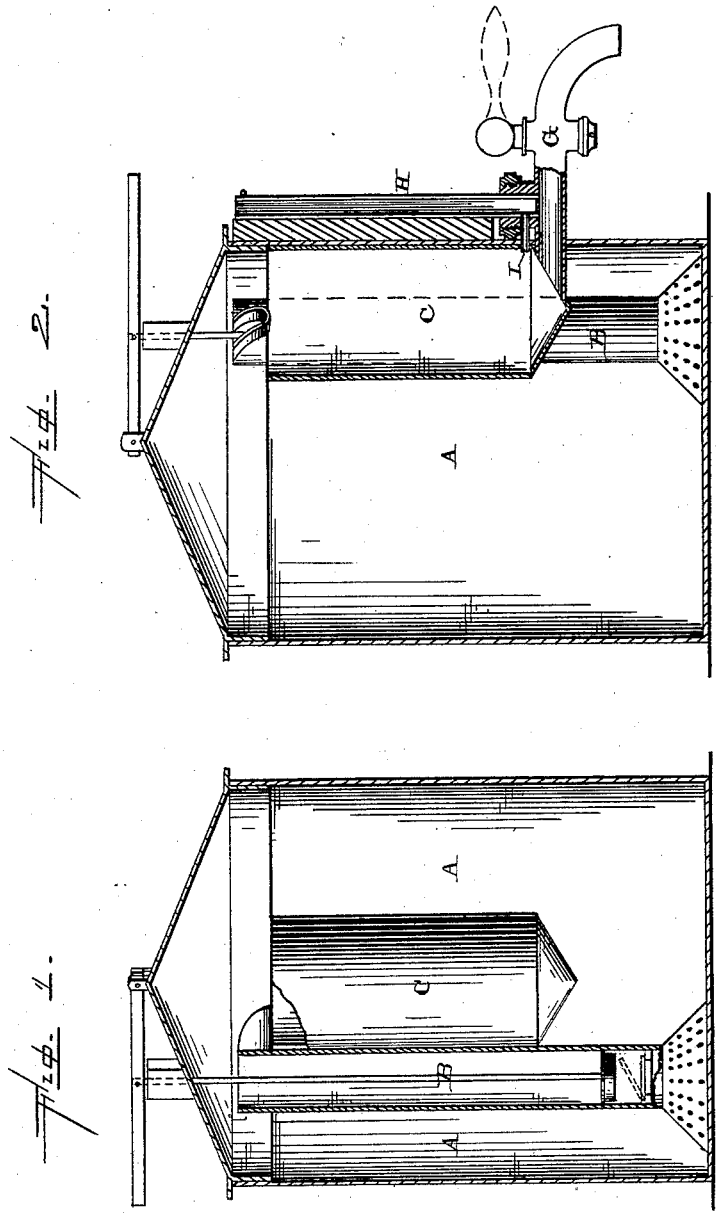
Witnesses.
R. F. Gardner
A. S. Pattison
Inventor.
E. A. Smead,
per
F. A. Lehmann,
Atty.

UNITED STATES PATENT OFFICE.

EPHRAIM A. SMEAD, OF TIOGA, PENNSYLVANIA.

MEASURING-TANK.

SPECIFICATION forming part of Letters Patent No. 305,973, dated September 30, 1884.

Application filed June 10, 1884. (No model.)

*To all whom it may concern:*

Be it known that I, EPHRAIM A. SMEAD, of Tioga, in the county of Tioga and State of Pennsylvania, have invented certain new and useful Improvements in Measuring-Tanks; and I do hereby declare the following to be a full, clear, and exact description of the invention, such as will enable others skilled in the art to which it pertains to make and use it, reference being had to the accompanying drawings, which form part of this specification.

My invention relates to an improvement in measuring-tanks; and it consists in the combination of a tank, a single measure placed therein, a pump which is used to fill the measure, a single faucet, and a gage-tube which is connected by means of a separate pipe with the bottom of the measure, as will be more fully described hereinafter.

The object of my invention is to provide a measuring-tank in which but a single faucet and measure are used, but through which all quantities of liquids up to a certain amount can be quickly, readily, and easily measured.

Figure 1 is a vertical cross-section taken through the center of the tank, showing the tank and the measure in the background. Fig. 2 is a vertical cross-section of the tank taken at right angles to Fig. 1 and through the center of the measure, gage, and faucet.

A represents the main tank, which will be of any desired size or shape which may be preferred; B, a common pump, and C a single measure, which is connected at its lower end with a single faucet, G. Upon the outer side of the tank is placed the gage-tube H, which is open at its upper end, and which is connected with the interior of the measure by means of the pipe I at its lower end. When oil or other liquid is pumped into the measure, the height of the liquid is shown in the gage-tube, and the operator sees by the rise of the liquid when he has pumped into the measure the desired quantity. It is then only necessary to open the faucet and allow the liquid to flow out. By this construction it will be seen that but a single measure and faucet are used, and that any desired quantity of liquid not exceeding the capacity of the measure can be quickly measured and drawn off.

I am aware that measuring-tanks have heretofore been patented in which there are a number of measures and a separate faucet connected to each measure, and this I disclaim. My invention differs from this in having but a single measure and a single faucet, and the gage-tube, which is connected by a small pipe with the interior of the measure, as shown.

Instead of the faucet as here shown, an ordinary valve which is operated by a rod which extends up through the cover and through the side of the tank may be used. The valve controls the flow of the fluid from the measure in the same manner as the faucet, and may be substituted for the faucet.

I am aware that a measuring-vessel has heretofore been placed inside of the tank and connected to the gage-tube, and this I do not broadly claim.

Having thus described my invention, I claim—

The combination of the tank A, the pump B, secured therein in contact with the measure, and having its spout projecting over its top, the measure C, secured in the upper portion of the tank, the faucet or valve G, the gage-tube H, and the pipe I, for connecting the lower end of the tube with the measure, substantially as shown and described.

In testimony whereof I affix my signature in presence of two witnesses.

EPHRAIM A. SMEAD.

Witnesses:
JOSEPH L. ALLEN,
FRANK E. WHUBE.